(12) United States Patent  Kim

(10) Patent No.: US 7,170,268 B2
(45) Date of Patent: Jan. 30, 2007

(54) DC TO DC CONVERTER WITH HIGH FREQUENCY ZIGZAG TRANSFORMER

(75) Inventor: Sangsun Kim, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 53 days.

(21) Appl. No.: 10/913,533

(22) Filed: Aug. 9, 2004

(65) Prior Publication Data

US 2006/0028187 A1    Feb. 9, 2006

(51) Int. Cl.
*G05F 1/40* (2006.01)
(52) U.S. Cl. ................................... 323/272
(58) Field of Classification Search ............ 323/272, 323/222, 282
See application file for complete search history.

(56) References Cited

U.S. PATENT DOCUMENTS

| 4,384,321 | A | * | 5/1983 | Rippel | 363/124 |
| 4,513,361 | A | * | 4/1985 | Rensink | 363/21.04 |
| 5,278,489 | A | * | 1/1994 | Bowers | 323/225 |
| 5,568,371 | A |   | 10/1996 | Pitel et al. |  |
| 6,084,790 | A | * | 7/2000 | Wong | 363/71 |

OTHER PUBLICATIONS

Sangsun Kim, "New Multiple DC—DC Converter Topology With A High Frequency Zig-Zag Transformer", Power Conversion SBU, Feb. 25, 2004.

Jinghai Zhou, Ming Xu, and Fred C. Lee, "A Novel Current-Tripler DC/DC Converter," PESC '03, pp. 1373-1378, 2003, no month.

Xunwei Zhou, Peng Xu, and Fred C. Lee, "A Novel Current-Sharing Control Technique For Low-Voltage High-Current Voltage Regulator Module Applications," IEEE Transactions on Power Electronics, vol. 15, No. 6, pp. 1153-1162, Nov. 2000.

Shinguo Luo, Zhihong Ye, Ray-Lee Lin, and Fred C. Lee, "A Classification And Evaluation Of Paralleling Methods For Power Supply Modules," PESC '99, pp. 901-908, 1999, no month.

A. Tuladhar, H. Jin, T. Unger, and K. Mauch, "Parallel Operation Of Single Phase Inverter Modules With No Control Interconnections," APEC '97, pp. 94-100, 1997, no month.

T. Kohama, T. Ninomiya and M. Shoyama, "Characteristics Of A Parallel-Module High Power-Factor AC-to-DC Converter System With Current-Balancing Controllers," INTELEC '95, pp. 791-795, 1995, no month.

(Continued)

*Primary Examiner*—Shawn Riley
(74) *Attorney, Agent, or Firm*—Rabin & Berdo, P.C.

(57) ABSTRACT

A DC to DC converter including a zigzag transformer. The transformer operates at high frequency with integrated magnetics and does not provide isolation. The multiphase converter has gate inputs with PWM signals appropriately phase-shifted depending on the number of phases to make balanced phase voltages across the transformer windings. The switching frequency of the converter is relatively low but fast transient response can be achieved by adding an integrated zigzag transformer.

25 Claims, 18 Drawing Sheets

OTHER PUBLICATIONS

Prasad N. Enjeti, Wajiha Shireen, Paul Packebush, Ira J. Pitel, "Analysis And Design Of A New Active Power Filter To Cancel Neutral Current Harmonics In Three-Phase Four-Wire Electric Distribution Systems," IEEE Transactions on Industry Applications, vol. 30, No. 6, pp. 1565-1572, Nov./Dec. 1994.

G. Kamath and N. Mohan, "A Novel, Reduced Rating Active Filter For 3-Phase, 4-Wire Loads" IAS '94, pp. 936-940, 1994, no month.

Olle I. Elgerd, "Sequence Network Representation Of Transformers In Three Phase Systems", Moloney Electric Company, MO, U.S.A., pp. 14-25, Mar. 1956.

* cited by examiner

*: SECONDARY WINDING TURNS RATIO 1:1

DUTY RATIO < 33.3%

33.3% < DUTY RATIO < 66.7%

66.7% < DUTY RATIO < 100%

DUTY RATIO = 33.3%

Balanced N-legged core n: # of phases $i_1 = i_2 = \ldots = i_{n-1},$ $(n \geq 2)$ Transformer winding currents: $i_{za} = i_{zb} = i_{zc}$, $i_s = 3i_{za}$

DC TO DC CONVERTER WITH HIGH FREQUENCY ZIGZAG TRANSFORMER

BACKGROUND OF THE INVENTION

1. Field of Invention

The invention relates to a DC to DC converter, and particularly to a DC to DC converter with a high frequency zigzag transformer.

2. Related Art

Dc-dc converters are widely used for battery-powered electronic equipment, renewable energy systems, and voltage regulator modules (VRM) to produce a regulated voltage or current derived from an unregulated power supply. Most converters require a higher switching frequency to improve the transient response and to reduce the size of passive components. However, such a high switching frequency of hard switching converter beyond 1 MHz is not available nowadays. Therefore, multiple operations with an interleaved switching on-off control are preferable for low voltage, high current converters. The paralleled interleaving operation of the switching converter is gaining popularity because it is more efficient. The $I^2R$ conduction power loss associated with power components of each module is greatly reduced. The interleaving converter also provides ripple cancellation and improved transient response. However, parallel modules must share current equally. Current imbalance may occur due to component tolerances and/or parameter variations.

FIGS. 1 and 2 show boost and buck converter topologies with 3-phase interleaving, respectively. In FIG. 1, the boost converter, which boosts the power source 10 to the load 20, includes a first inductor L1 connected to a first diode D1, a second inductor L2 connected to a second diode D2, and a third inductor L3 connected to a third diode D3. The other terminals of the diodes D1, D2 and D3 are connected to one terminal of the load 20. A first transistor T1, a second transistor T2 and a third transistor T3 are also included. The drain terminal of the first transistor T1 is connected between the first inductor L1 and the first diode D1, while the source terminal of the first transistor T1 is connected to the other end of the load 20. The connection of the second transistor T2 and the third transistor T3 are similar to the transistor T1. A capacitor C is connected to the load 20 in parallel.

In FIG. 2, the buck converter, which bucks the power source 10 to the load 20, includes a first transistor T1 connected to a first inductor L1, a transistor T2 connected to a second inductor L2, and a third transistor T3 connected to a third inductor L3. The other terminals of the inductors L1, L2 and L3 are connected to one terminal of the load 20. A fourth transistor T4, a fifth transistor T5 and a sixth transistor T6 are also included. The drain terminal of the fourth transistor T4 is connected between the first transistor T1 and the first inductor L1, while the source terminal of the fourth transistor T4 is connected to the other end of the load 20. The connections of the fifth transistor T5 and the sixth transistor T6 are similar to the fourth transistor T4. A capacitor C is connected to the load 20 in parallel.

However, there are some technical problems in these conventional converters. For example, they require three currents sensed for current sharing purposes, and thus suffer from higher ripple current on semiconductor devices. Furthermore, the conventional converter requires many magnetic cores. For the foregoing reasons, there is need for a converter with simpler circuitry and higher efficiency.

SUMMARY OF THE INVENTION

In view of the foregoing problems, a DC to DC converter with a high frequency zigzag transformer is provided to substantially eliminate the problems of the conventional topology. The disclosed DC to DC converter with a high frequency zigzag transformer is capable of reducing current ripple, simplifying current control, and achieving better transient response. Current ripples are reduced on all switching devices and passive components by adjusting the operating point near boundary conditions. So conduction losses are minimized at the operating points near boundary conditions. Current sharing control is not necessary and transient response is faster because all phase currents flow equally through the transformer windings. Phase-shifted PWM switching signals offer balanced voltages in the transformer windings.

In accordance with one aspect of the invention, the boost DC to DC converter with a high frequency zigzag transformer of the invention includes a transformer having plurality-of-legged cores; a plurality of diodes, each P side of the diodes connected to each leg of the cores of the transformer; and a plurality of transistors, each drain terminal of the transistors connected to each winding of the core legs of the transformer.

In accordance with the other aspect of the invention, the buck DC to DC converter with a high frequency zigzag transformer is also provided. The buck DC to DC converter includes a transformer having plurality-of-legged cores; and a plurality pairs of transistors, each of the pair of transistors connected in series, and each leg of the transformer connected between the transistors connected in series.

According to the principle of the invention, the disclosed DC to DC converter has the advantage of not requiring current-sharing technique.

According to the principle of the invention, the disclosed DC to DC converter has another advantage of having no current ripples on passive and switching components.

According to the principle of the invention, the disclosed DC to DC converter has another advantage of lower conduction loss.

According to the principle of the invention, the disclosed DC to DC converter has another advantage of fast transient response even with lower switching frequency.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompanying drawings are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

The invention will become more fully understood from the detailed description given in the illustration below only, and is thus not limitative of the present invention. Reference will now be made in detail to the preferred embodiments of the present invention, examples of which are illustrated in the accompanying drawings.

Figure 3:
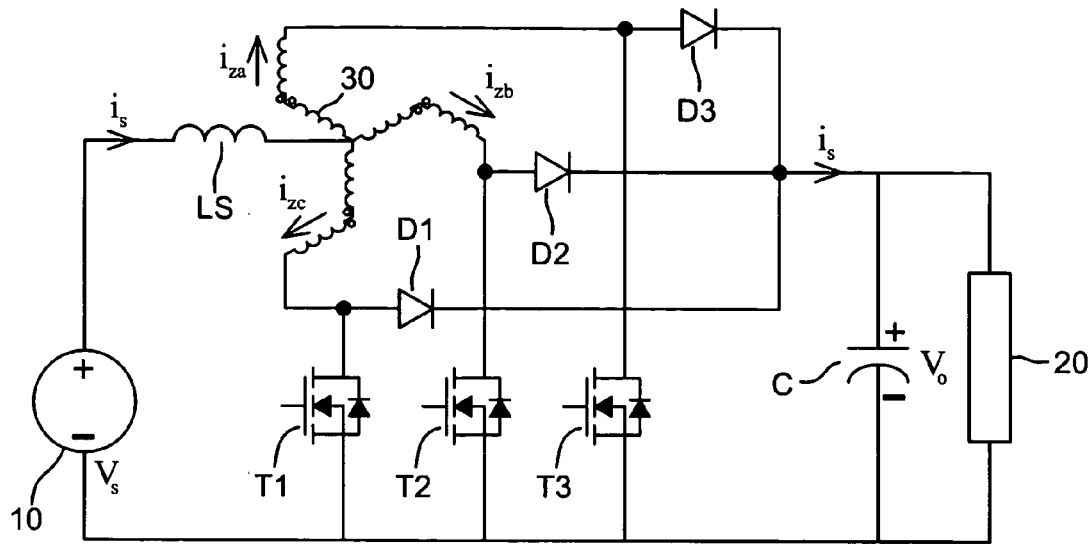
FIG. 3 is a circuit diagram of the boost converter in accordance with the invention.

Refer to FIG. 3, which illustrates the circuit diagram of a boost converter in accordance with the invention. The boost converter, which boosts the power source 10 to the load 20, is composed of a transformer 30, an input inductor LS, a first diode D1, a second diode D2, a third diode D3, a first transistor T1, a second transistor T2 and a third transistor T3. A capacitor C is connected in parallel with the load 20.

The transformer 30 is a kind of autotransformer that does not provide isolation. For example, a zigzag transformer having three terminals may be adopted as the transformer 30. The core material of the transformer 30 should be ferrite without any airgaps. The input inductor LS is connected to the central terminal of the transformer 30. The P sides of the diodes D1, D2, and D3 are connected to each of the three terminals of the transformer 30, respectively. The drain terminals of the transistors T1, T2, and T3 are connected to each of the three terminals of the transformer, while the source terminals of the transistors T1, T2, and T3 are connected to the ground end of the power source 10. The gate terminals of the transistors T1, T2, and T3 receive the PWM signals, which are appropriately phase-shifted.

Figure 4:
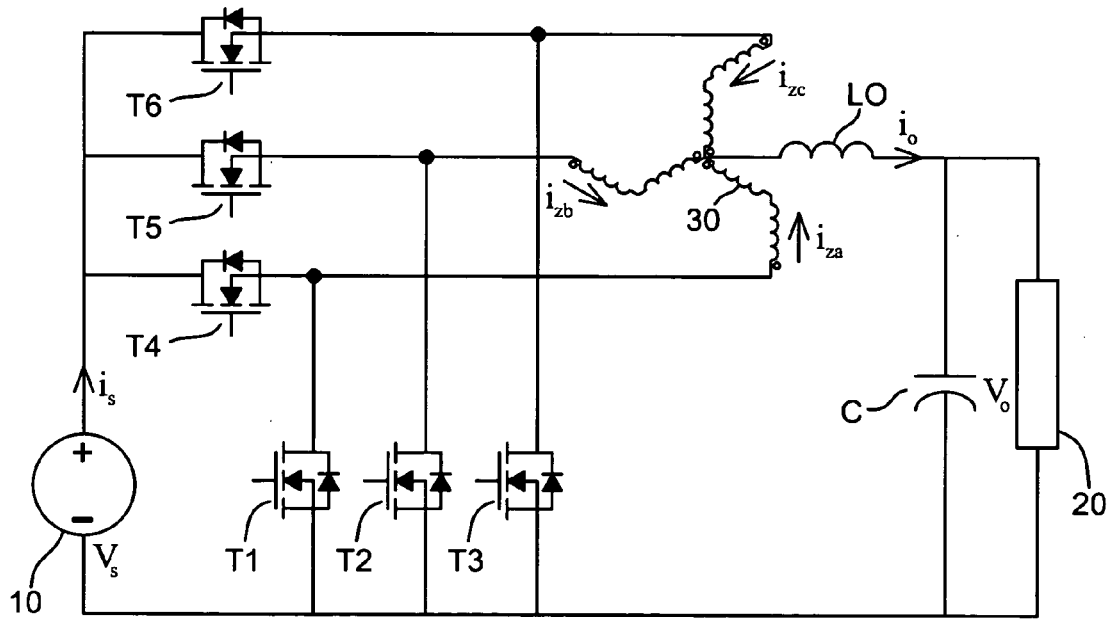
FIG. 4 is a circuit diagram of the buck converter in accordance with the invention.

Refer to FIG. 4, which illustrates the circuit diagram of a buck converter in accordance with the invention. The buck converter, which bucks the power source 10 to the load 20, is composed of a transformer 30, an output inductor LO, a first transistor T1, a second transistor T2, a third transistor T3, a fourth transistor T4, a fifth transistor T5, and a sixth transistor T6. A capacitor C is connected in parallel with the load 20.

Similarly, the transformer 30 is a kind of autotransformer that does not provide isolation. For example, a zigzag transformer may be adopted as the transformer 30. The core material of the transformer 30 should be ferrite without any airgaps. The output inductor LO is connected to the central terminal of the transformer 30. The drain terminals of the transistors T1, T2, and T3 are connected to the three terminals of the transformer 30, respectively, while the source terminals of each of the transistors T1, T2, and T3 are connected to the ground end of the power source 10. The drain terminals of the transistors T4, T5, and T6 are connected to the power source 10, while the source terminals of the transistors T4, T5, and T6 are connected to the three terminals of the transformer 30, respectively. The gate terminals of the transistors T1, T2, T3 receive the PWM signals, which are appropriately phase-shifted.

Figure 5A:
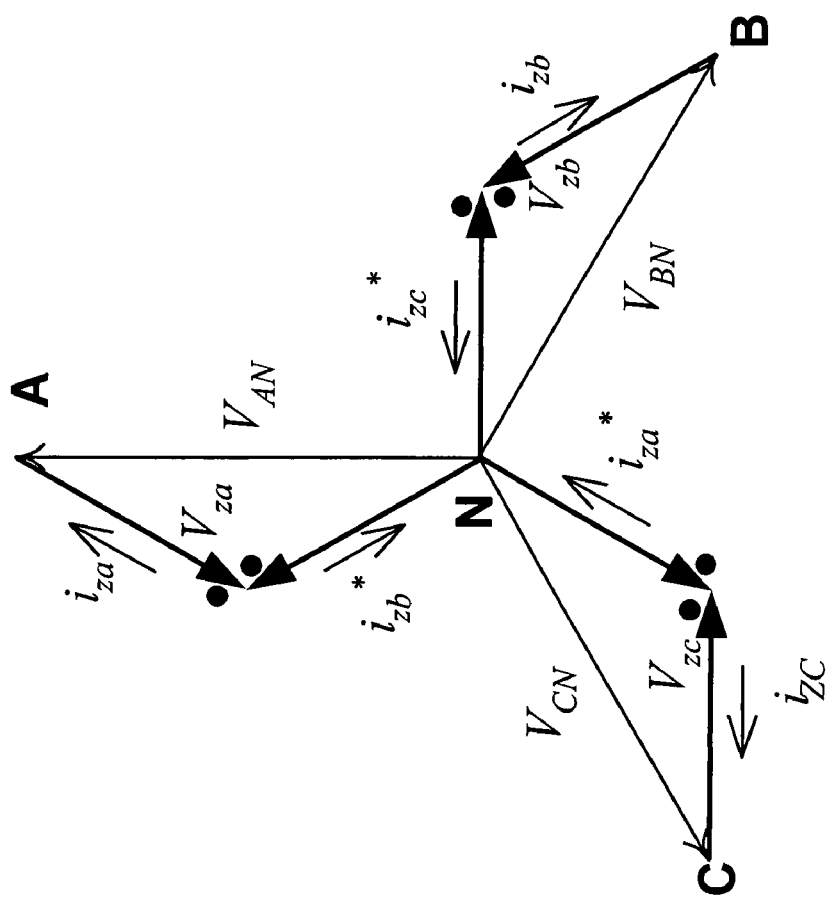
FIG. 5A shows the voltage vector diagram of the zigzag transformer employed by the invention.
Figure 5B:
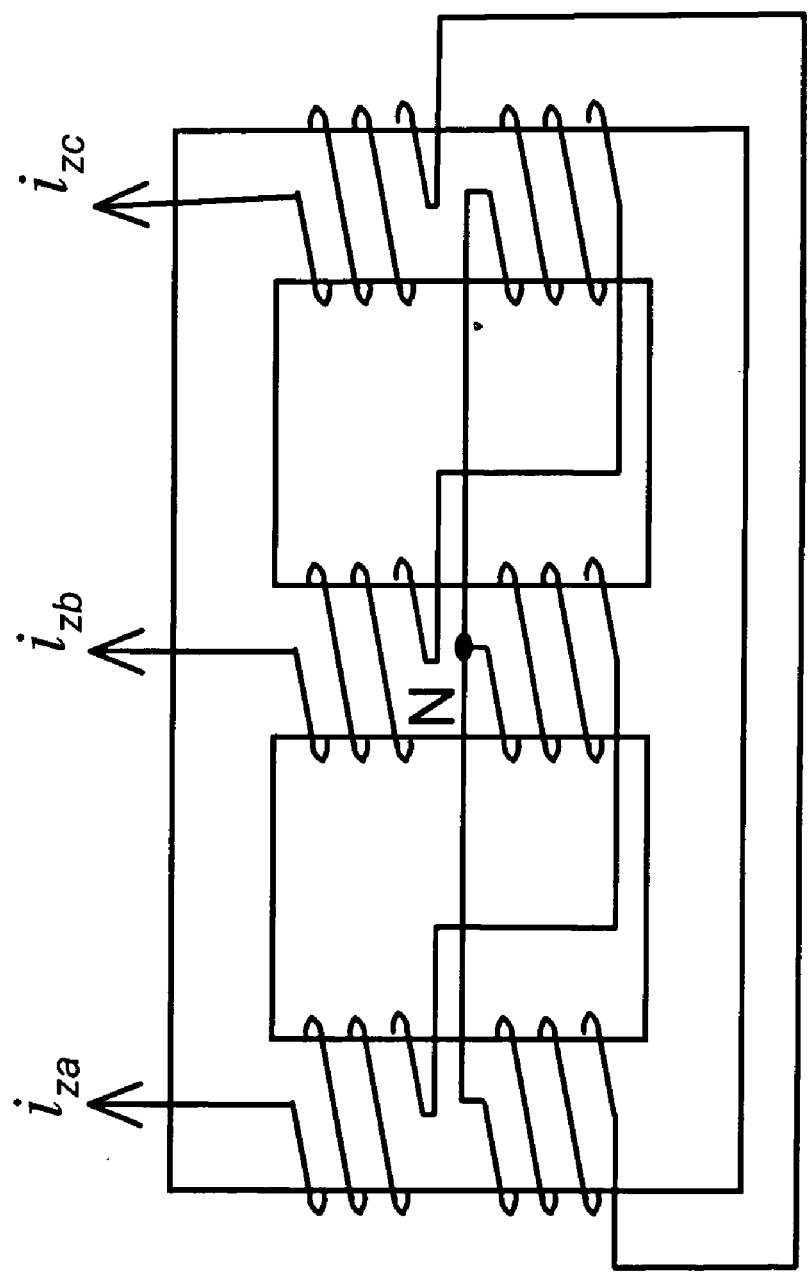
FIG. 5B shows the winding connections of the zigzag transformer employed by the invention.

The transformer 30 is a kind of autotransformer that does not provide isolation. The voltage vectors and winding connections on the three-legged core of the zigzag transformer are shown in FIGS. 5A and 5B, respectively. Each leg of the transformer 30 has two windings. The winding connection is made according to the voltage vector, as shown in FIG. 5A. The converters in FIGS. 3 and 4 can operate with a zigzag coupled inductor for other applications. The zigzag coupled inductor has the same core and winding connection as the zigzag transformer, but needs airgaps in the core. In other words, the transformer 30 may be substitute with a zigzag coupled inductor. In the present invention, the transformer 30 and the zigzag coupled inductor are defined as a zigzag device.

The disclosed converter has three gate inputs for PWM signals, which are appropriately phase-shifted with 120 degrees to balance the three-phase voltages ($V_{za}+V_{zb}+V_{zc}=0$) across the transformer windings. The three gate inputs are the gate terminals of the transistors T1, T2, T3. The input inductor LS and the output inductor LO are used to reduce the ripple current, since the leakage inductor of the transformer 30 may not be enough or higher leakage inductance may not be favorable.

Based on the balanced winding voltages, for all winding currents to meet the requirement for current flow into a three-phase transformer, they must be equally distributed as $i_{za}=i_{zb}=i_{zc}=-i^*_{za}=-i^*_{zb}=-i^*_{zc}$, where $i_{zj}(j=a,b,c)$ is the transformer winding current and * denotes secondary winding. The current of the power source 10 includes dc, is three times the switching frequency, and is three times the winding current as $i_s=3i_{za}$.

The winding voltage $v_{za}$ neglecting resistances and leakage inductances is written by $$v_{za} = L_{za}\frac{di_{za}}{dt} + L_{zb}\frac{di_{za}}{dt} - M_{ab}\frac{di_{zc}}{dt} - M_{ab}\frac{di_{zb}}{dt},$$

where $L_{za}$ and $L_{zb}$ are self inductances of a and b phases, respectively and $M_{ab}$ is mutual inductance between a and b phases. The impedance $Z_{AN}$ for the equal currents becomes $Z_{AN}=2\omega(L_{za}-M)\approx 0$, where $L_{za}=L_{zb}\approx M$, $\omega=2\pi f$ and f is switching frequency.

Since the leakage coefficient is small, the transformer offers substantially lower impedance when the equal currents flow via all the transformer windings. On the other hand, the impedance considering the balanced three-phase currents at switching frequency is obtained by $Z_{AN}=3\omega L_{za}$.

Therefore, the switching frequency current component flowing into the zigzag transformer is negligible due to higher impedance path. The sum of all identical fluxes on three legs is not equal to zero so that the flux can flow through a small impedance path. However, there is no magnetomotive force (MMF) in all three legs since the currents entering the transformer are in phase. As a result, no flux except leakage flux occurs without providing excess losses.

The operation of the boost DC to Dc converter and the buck DC to DC converter in accordance with the invention is illustrated in detail in the following paragraphs. The boost converter with a high-frequency zigzag transformer is first illustrated.

Figure 6A:
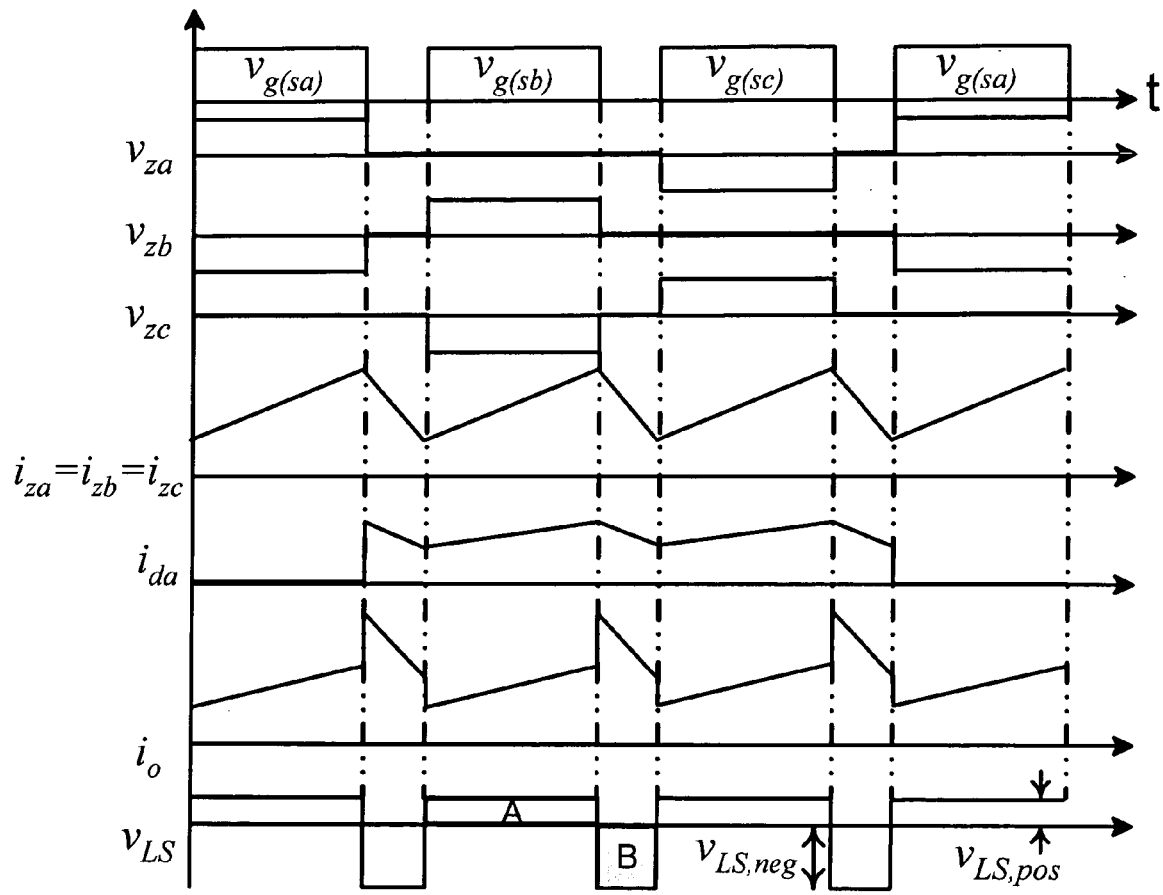
FIGS. 6A to 6D show the operational waveforms of the 3-phase boost converter in accordance with the invention.
Figure 6B:
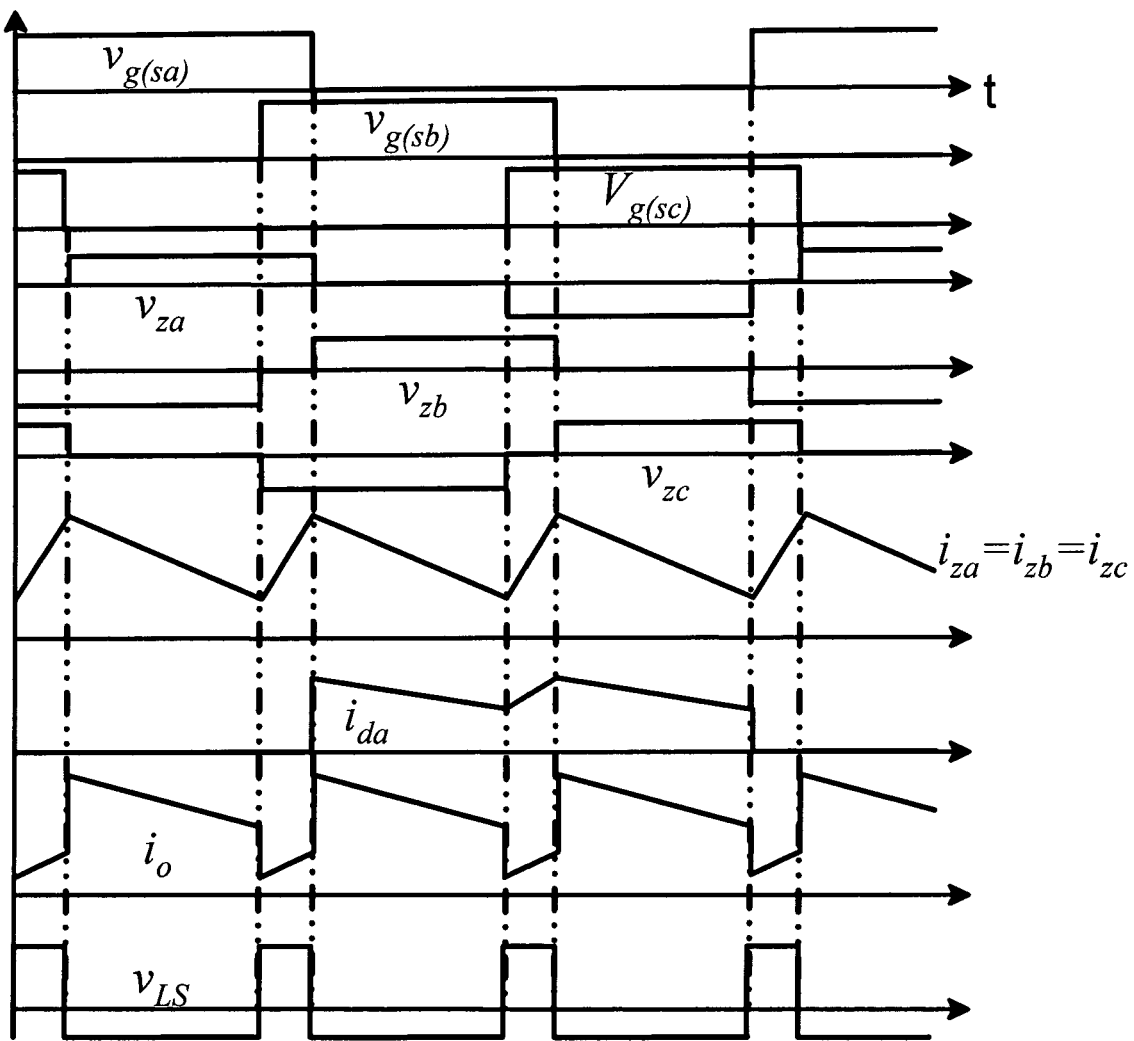
Figure 6C:
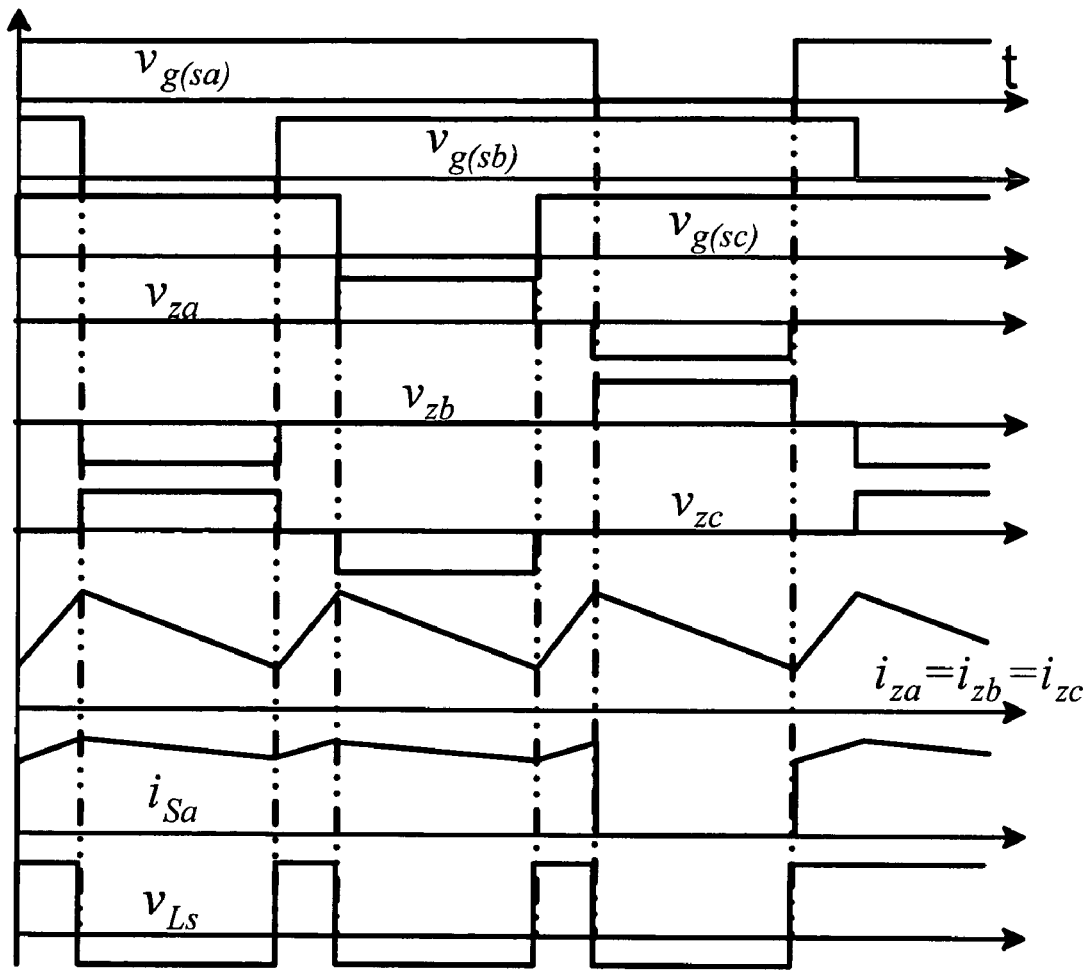

Depending on overlapping periods between phase-shifted switching signals, the operation of the boost converter is divided into three different modes: (1) D<33.3%; (2) 33.3%<D<66.7%; and (3) 66.7%<D<100%. Similar to the conventional converter, the transfer function of the disclosed boost type is expressed by defining a conversion ratio M as the ratio of the output voltage to the input voltage, $$M = \frac{V_O}{V_S} = \frac{1}{1-D},$$

where D is the duty ratio of the boost switch, $V_s$ is the dc input voltage of the power source 10, and $V_o$ is the output voltage. The duty ratio is the on-off time ratio of the boost switch. All the transformer winding currents are identical if the magnetizing inductance is high enough. Key operational waveforms are shown in FIGS. 6A to 6C according to three different modes.

Current ripples appear at three times the switching frequency and 3-phase voltage balancing is obtained by interleaving 3-gate signals. Basic equations are derived as follows.

D<33.3%: (1)

In this mode, overlap between gate signals never exists. To obtain ripple current on the input inductor, the voltage across the inductor is $V_{Ls,neg}=V_s-V_o$, where $V_{Ls,neg}$ is the negative voltage magnitude across the inductor as defined in FIG. 5A. Also, $V_{Ls,pos}$ denotes the positive inductor voltage. The areas A and B of the inductor voltage must be equal, therefore, $$V_{Ls,pos} = \frac{1-3D}{3D}V_{Ls,neg} = \frac{1-3D}{3(1-D)}V_S.$$

Finally, the ripple current is obtained as $$\Delta I_S = \frac{V_{Ls,pos}}{L_S}DT_S = \frac{D(1-3D)}{3(1-D)}\frac{T_SV_S}{L_S}.$$

33.3<D<66.7%: (2)

As shown in FIG. 6B, overlapping only occurs between two gate signals. The inductor positive and negative magnitudes are expressed as $V_{Ls,neg}-V_{Ls,pos}=V_o-2V_s$, and $$V_{Ls,pos} = \frac{2-3D}{3D-1}V_{Ls,neg} = \frac{2-3D}{3(1-D)}V_S$$

respectively.

The ripple current in this mode is $$\Delta I_S = \frac{V_{Ls,pos}}{L_S}\frac{(3D-1)}{3}T_S = \frac{(3D-1)(3D-2)}{9(D-1)}\frac{T_SV_S}{L_S}.$$

66.7 < D < 100%: (3)

As shown in FIG. 6C, overlapping between three switching signals exists in this mode. The voltage across the inductor is equal to the input voltage if all three switches are turned on. In this mode, $V_{Ls,pos}=V_s$.

The ripple current is linearly increased by $$\Delta I_S = \frac{V_{Ls,pos}}{L_S}\left(D-\frac{2}{3}\right)T_S = \frac{D-2}{3}\frac{T_SV_S}{L_S}.$$

Figure 1:
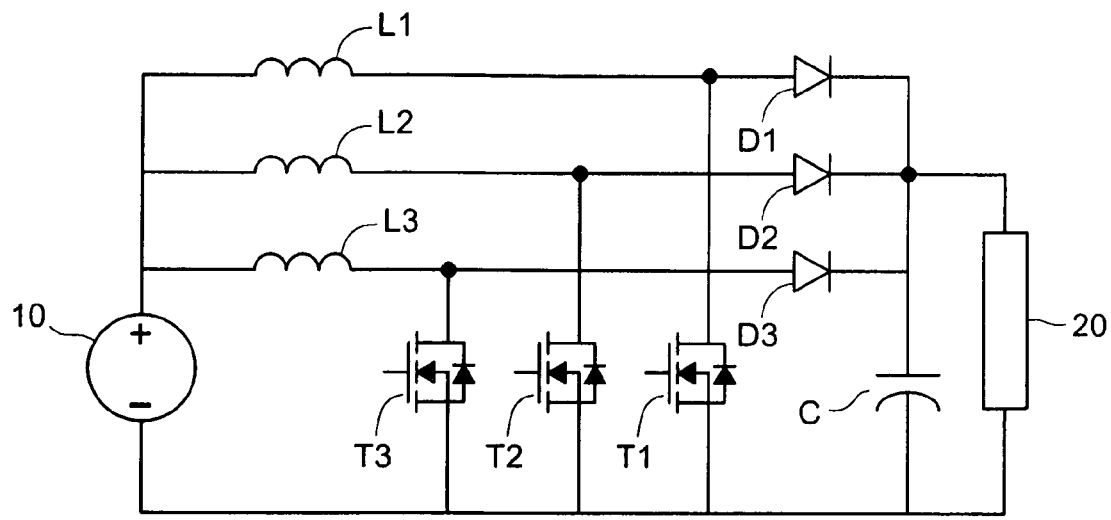
FIG. 1 is a circuit diagram of the boost converter of the prior art.
Figure 2:
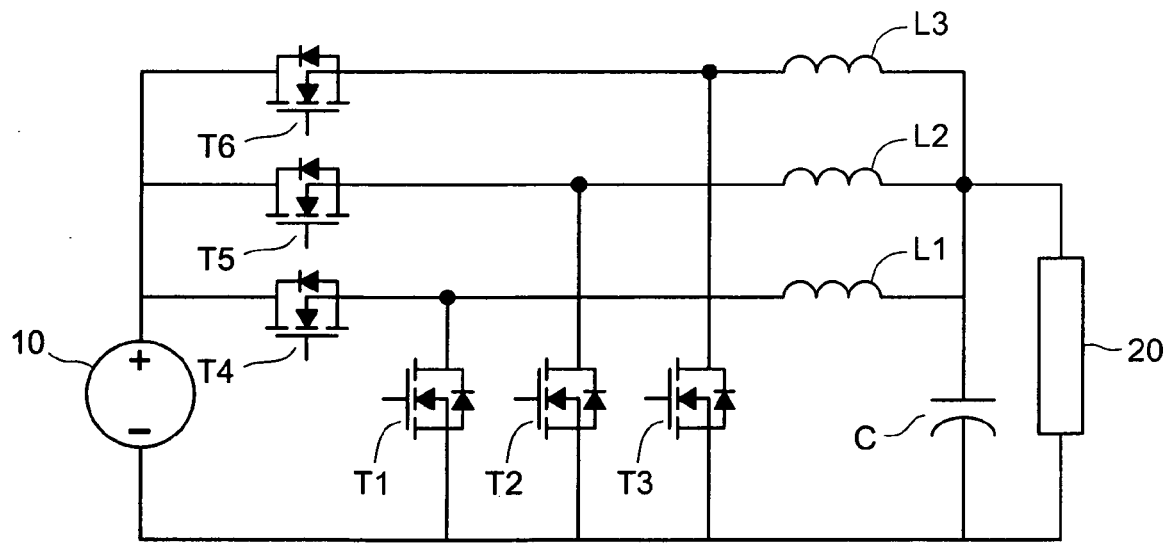
FIG. 2 is a circuit diagram of the buck converter of the prior art.
Figure 6D:
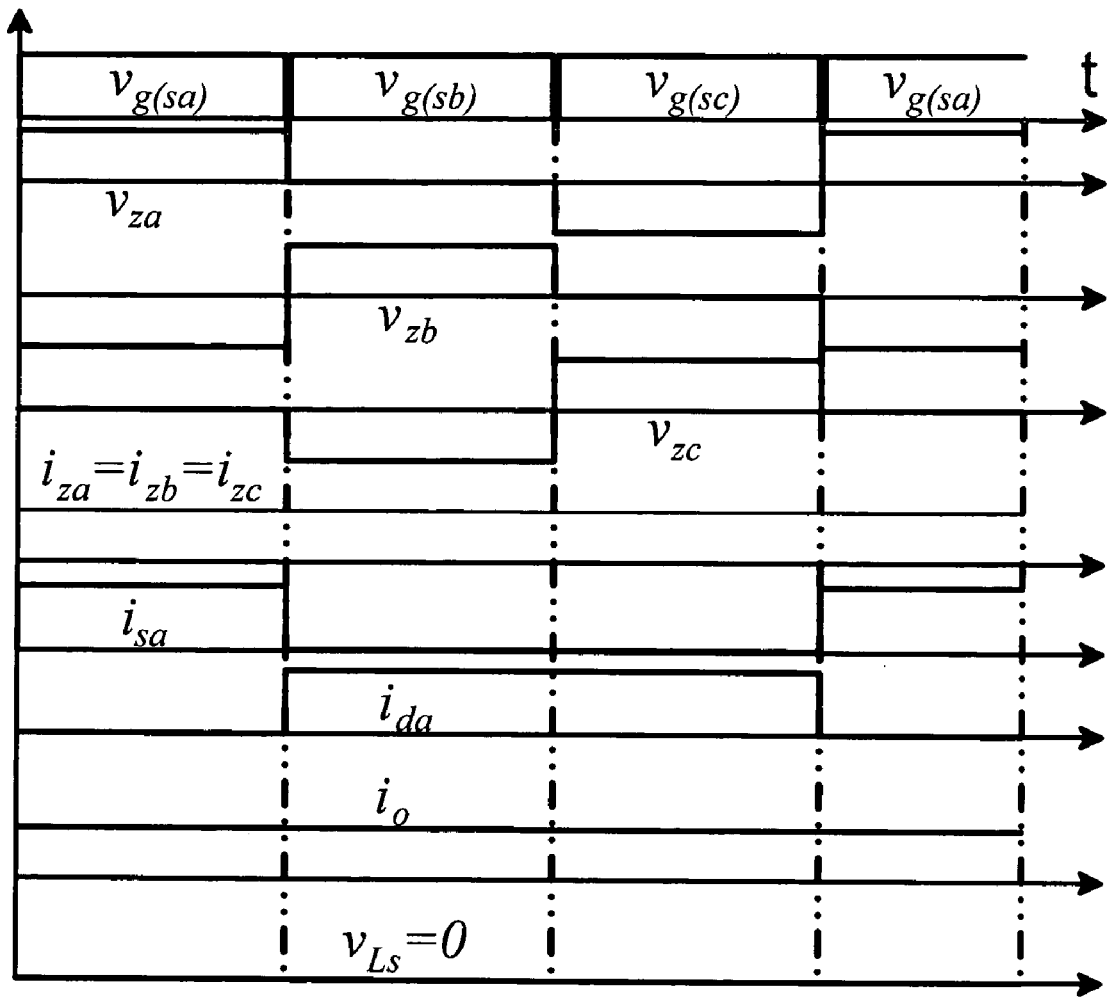

FIG. 6D shows the boost converter operation at D=33.3%. Input current and the sum of 3-diode currents contain only dc quantities. These currents provide less stress on both the input filter and the output dc capacitor. In the conventional approach in FIG. 1 and FIG. 2, each phase current has its own ripple at the boundary point. After interleaving together, the ripples of total input current cancel each other. The ripple current appears on all switching devices. However, the topology with a zigzag transformer does not show any current ripple on all switching devices and passive components at boundary conditions. All phase currents are dc constants, as shown in FIG. 6D. Therefore, conduction losses of the switching and passive components can be lower than the conventional approach. Furthermore, since 3-winding currents flow equally, a current sharing scheme is not necessary and output transient response is faster than the conventional scheme.

The multiple interleaved synchronous buck topologies with a zigzag transformer are introduced in the following.

Similar to the above boost converter, the operation of the buck converter is also divided into three different modes: (1) D<33.3%, (2) 33.3%<D<66.7%, and (3) 66.7%<D<100%. The relationship between input and output voltages is $V_o=DV_s$.

Figure 7:
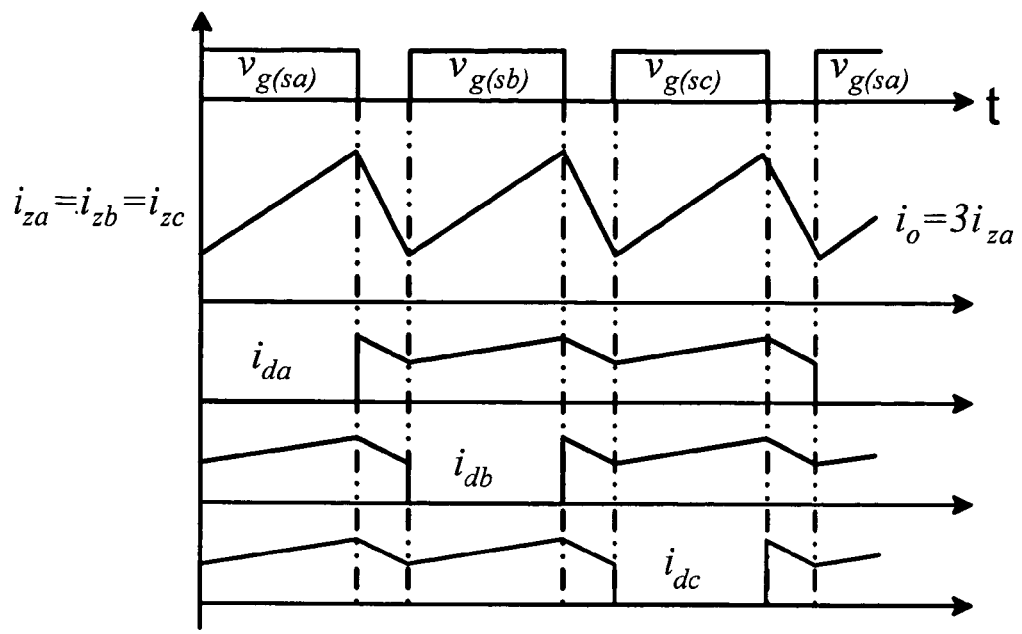
FIG. 7 shows the operational waveforms of the 3-phase buck converter in accordance with the invention.

Basic equations for ripple currents on the inductor Lo are given as follows. Key operational waveforms are shown in FIG. 7.

$$D < 3.33\% \quad (1)$$

$$V_{Lo,neg} = DV_S.$$

$$\Delta I_{Lo} = \frac{V_{Lo,neg}}{L_O}\left(\frac{1}{3} - D\right)T_S = \frac{D(1-3D)}{3}\frac{T_S V_S}{L_O}.$$

$$33.3\% < D < 66.7\% \quad (2)$$

$$V_{Lo,neg} = \frac{3D-1}{3}V_S.$$

$$\Delta I_{Lo} = \frac{V_{Lo,neg}}{L_O}\left\{D - 2\left(D - \frac{1}{3}\right)\right\}T_S = \frac{(3D-1)(2-3D)}{9}\frac{T_S V_S}{L_o}.$$

$$66.7\% < D < 100\% \quad (3)$$

$$V_{Lo,pos} = (1-D)V_S.$$

$$\Delta I_{Lo} = \frac{V_{Lo,neg}}{L_O}\left(D - \frac{2}{3}\right)T_S = \frac{(1-D)(3D-2)}{3}\frac{T_S V_S}{L_O}.$$

Figure 8A:
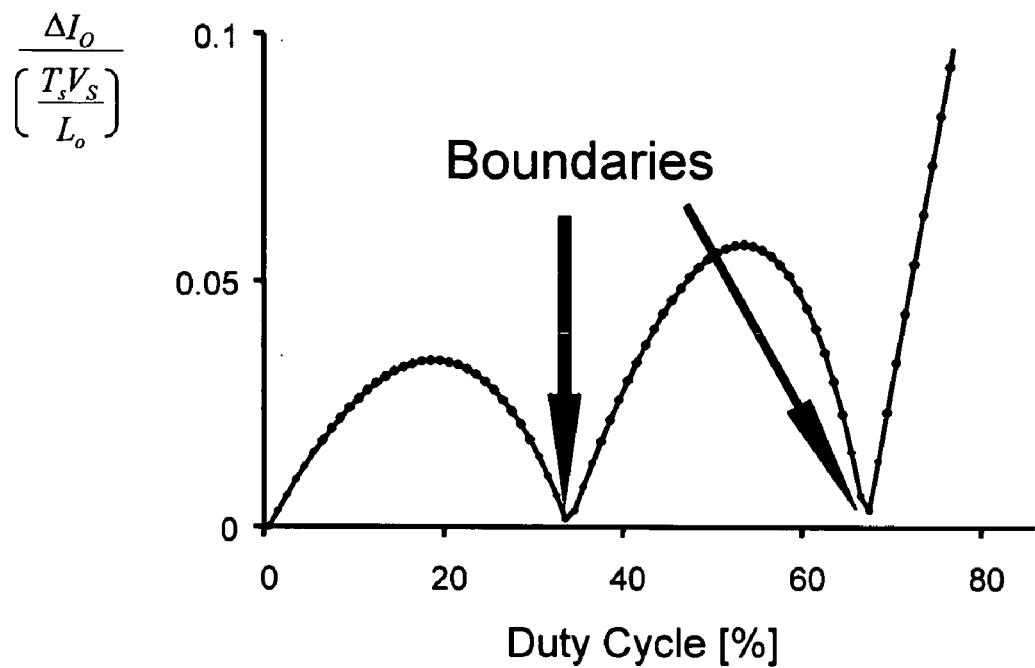
FIGS. 8A and 8B show normalized ripple currents of the inductor in the converters in accordance with the invention.

The inductor ripple currents of the boost converter in accordance with the invention are normalized by $T_s V_s/L_s$ and plotted according to a duty cycle as shown in FIG. 8A. Nearly ripple-free operation can be achieved at the boundary conditions such as D=33.3% and D=66.7% in a 3-interleaved converter. Therefore, to minimize the ripple current, the operating points of the boost converter design need to be set near those boundaries.

Figure 8B:
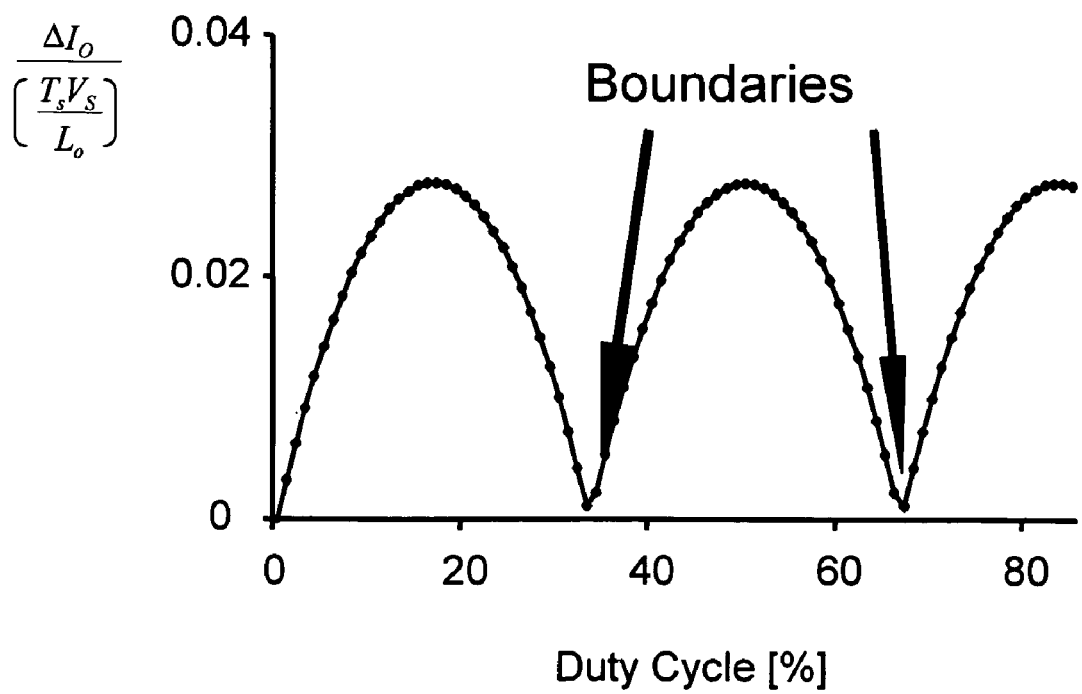

The normalized ripple currents of the buck converter are shown in FIG. 8B. The buck converter in accordance with the invention also provides ripple-free currents near the boundary points. Such buck converters can be widely used for voltage regulator modules (VRMs) with high current and low voltage.

Figure 9:
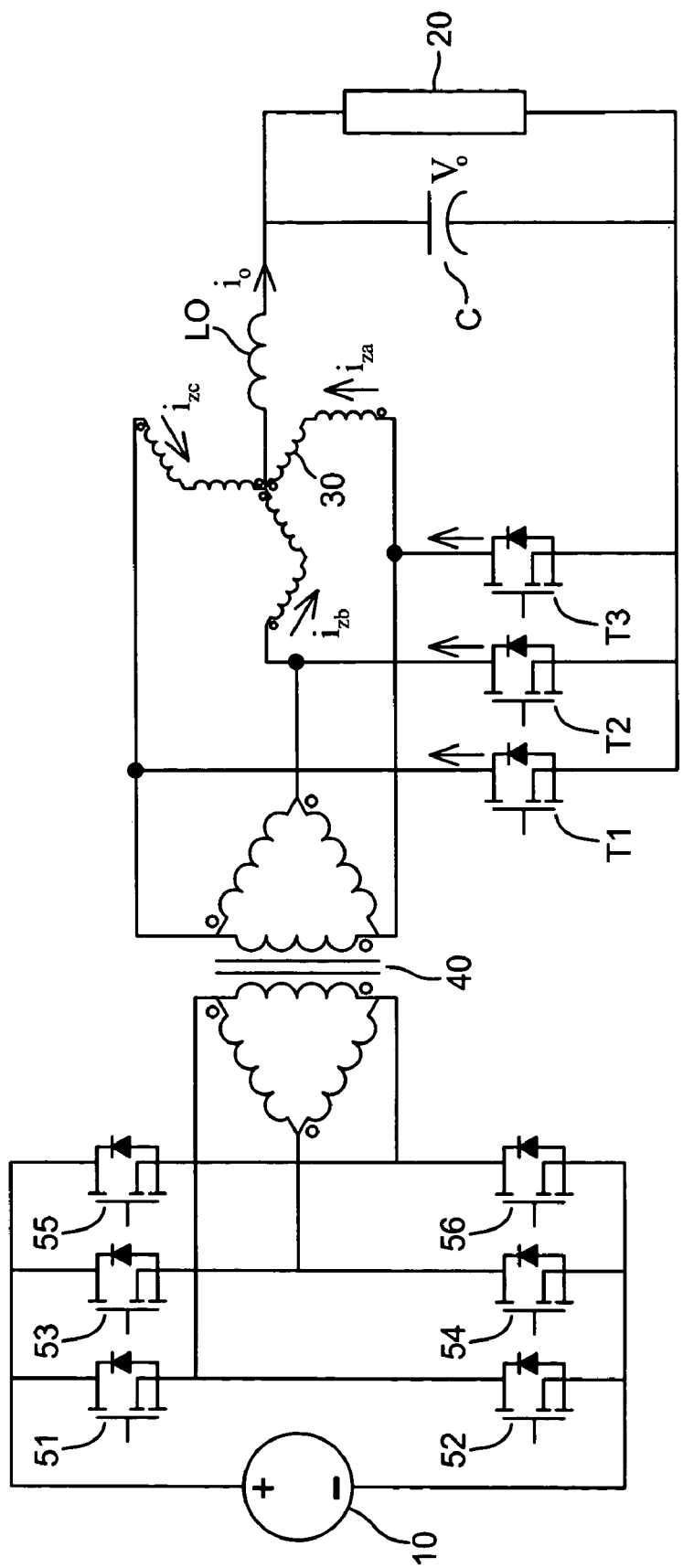
FIG. 9 shows an isolated DC to DC converter with a zigzag transformer in accordance with the invention.

A current tripler as shown in FIG. 9 is the isolated version with a zigzag transformer in accordance with the invention. This topology requires 2 three-phase magnetic cores.

The isolated DC to DC converter with a zigzag transformer in FIG. 9 include an integrated zigzag transformer 30 having 3-legged cores. The connection, function and operation of the transformer 30, and the first transistor T1, the second transistor T2 and the third transistor T3 are similar with the above mentioned embodiment. Besides, the converter includes a three-phased transformer 40 having a primary winding and a second winding, wherein the second winding is connected to the integrated zigzag transformer. Six transistors 51~56 are also included in the converter shown in FIG. 9. The six transistors 51~56 form three pairs, each pair has two transistors connected in series. Each phase of the primary winding of the transformer 40 is connected between the two transistors in each pair.

Figure 10A:
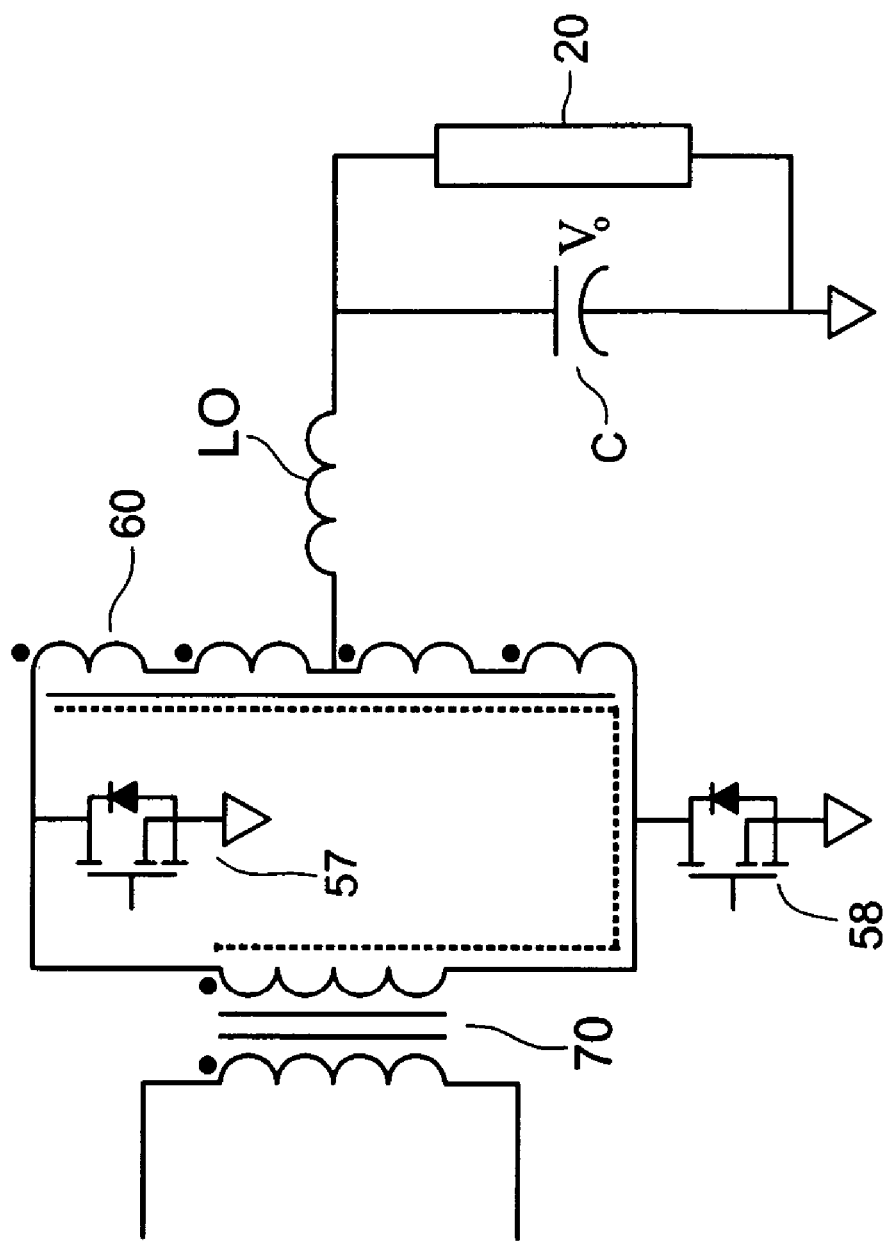
FIG. 10A shows a current double rectifier with a two-phase zigzag transformer in accordance with the invention.
Figure 10B:
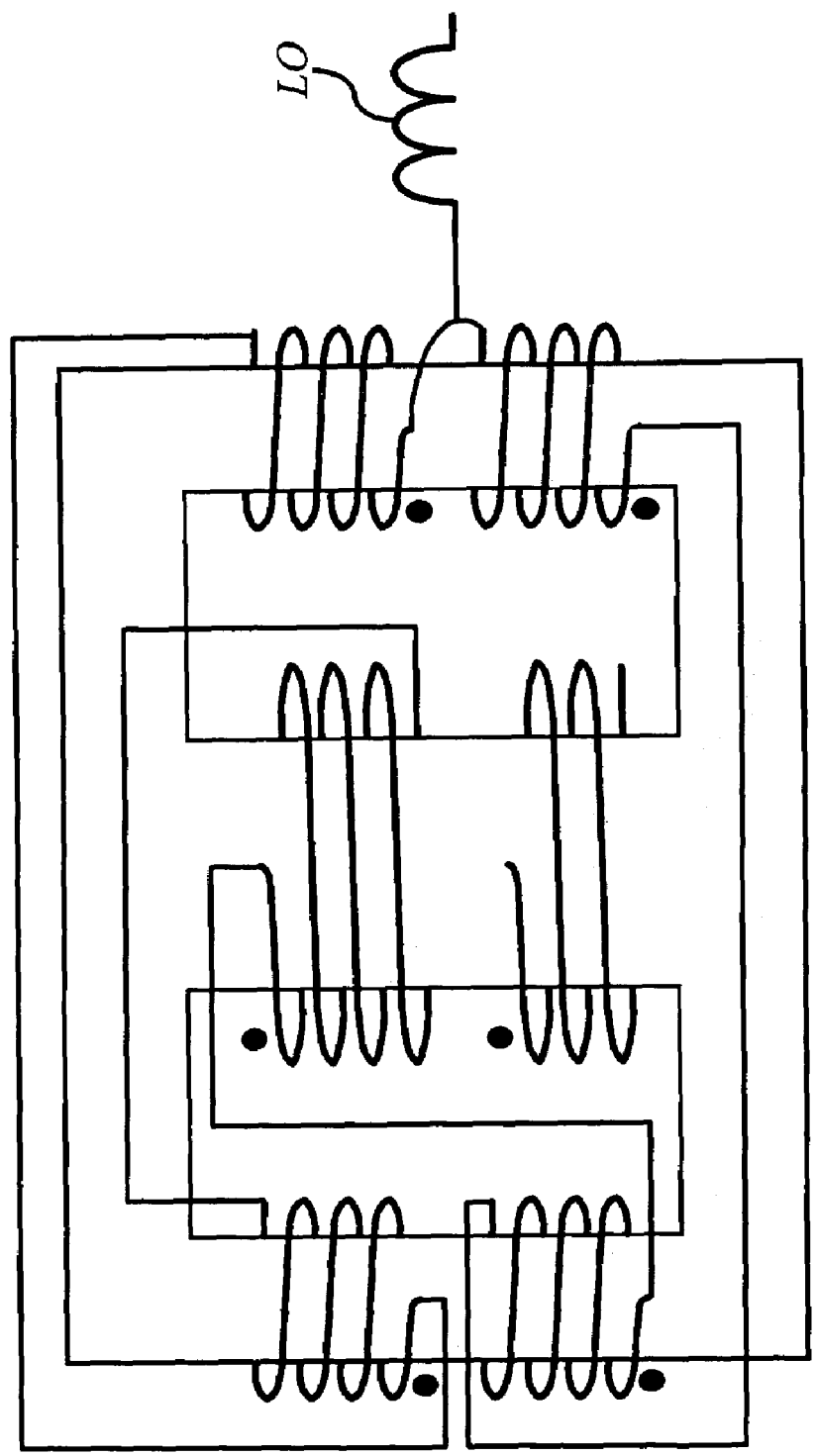
FIG. 10B shows the winding connection of the two-phase zigzag transformer included in the current double rectifier in accordance with the invention.

FIG. 10A shows a current doubler rectifier with an integrated magnetrics in accordance with the invention. A two phase zigzag transformer without airgaps is included in the current doubler. The winding connection of the transformer is illustrated in FIG. 10B. The current doubler has a transformer 70 having a primary winding and a second winding, and a zigzag transformer with two phases 60. The two-phase windings are connected to the second windings of the transformer 70.

Besides, an output inductor LO is connected to the central terminal of the transformer 60. A capacitor C is connected in parallel with the load 20. Two transistors 57~58 are connected to each winding of the transformer 60.

Figure 11:
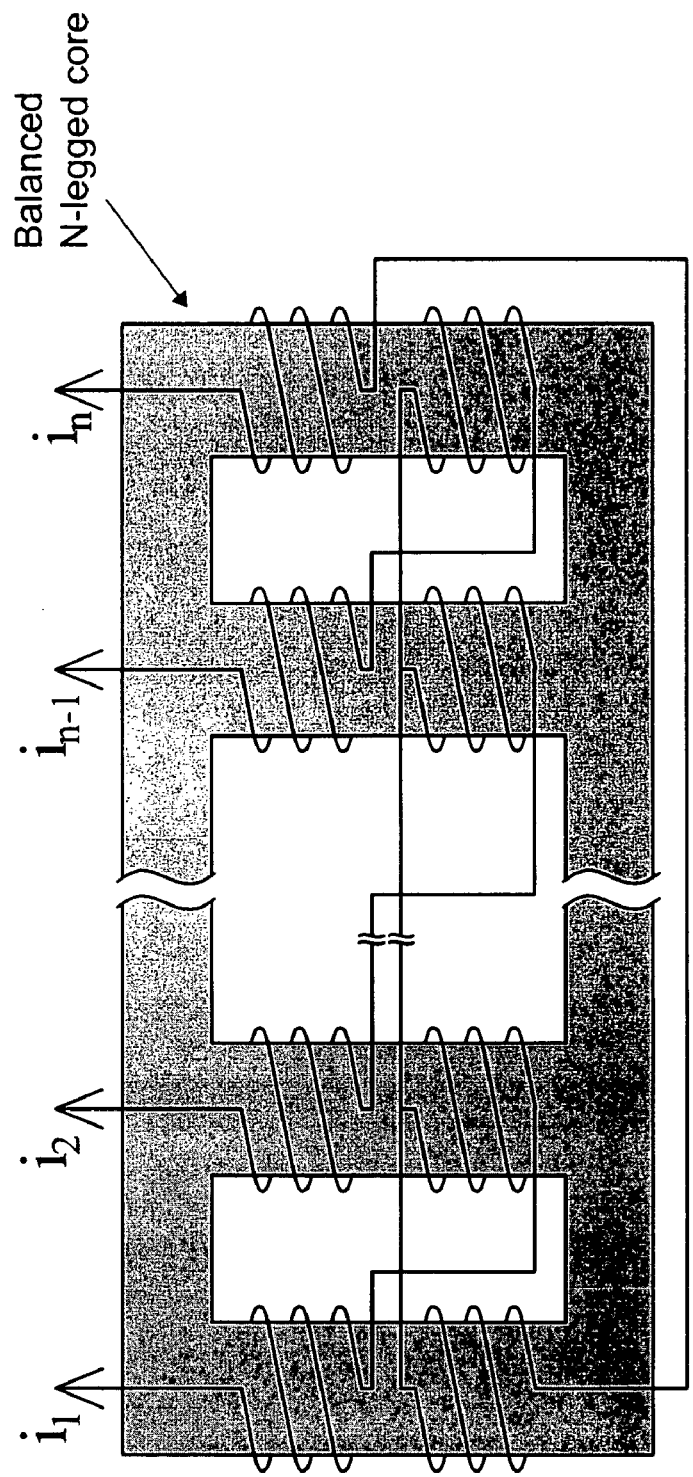
FIG. 11 shows the N-legged core structure of multiple zigzag transformers for multiphase DC to DC converter in accordance with the invention.

In the previous illustration, only 3-interleaved converter topologies have been shown. However, the 3-phase version can be extended to a multiple-phase structure more than 2-phases by adding the number of legs on the magnetic core, as shown in FIG. 11. Core material should be ferrite without any airgaps. Available topologies include boost converters, buck converters, Cuk converter, Sepic converter, and isolated converter. A zigzag coupled inductor may also be employed in the converter. Also, any current smoothing inductors in other dc-dc converters may be replaced by zigzag transformers. With balanced winding voltages, all winding currents are equally distributed as $i_1=i_2=\ldots =i_{n-1}$, ($n \geq 2$), where n is the number of phases. Overall input/output frequency occurs at n times switching frequency. The duty cycles $D_n$ at the boundaries are obtained according to the number of interleaving phases $$D_n = \frac{100}{n}h \ [\%], (h = 1, 2, \ldots, n-1).$$

Figure 12A:
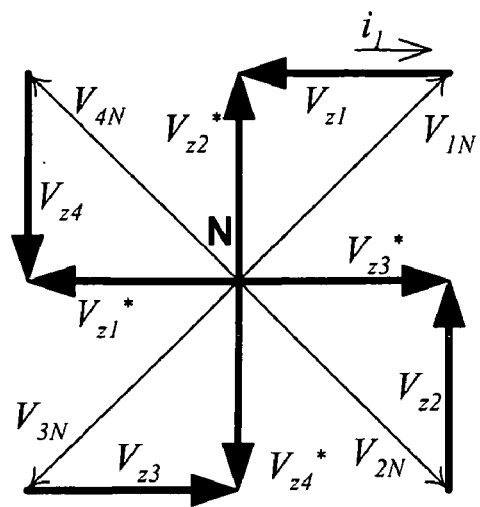
FIGS. 12A and 12B show the voltage vectors for the converters with 4 and 5 phases in accordance with the invention.
Figure 12B:
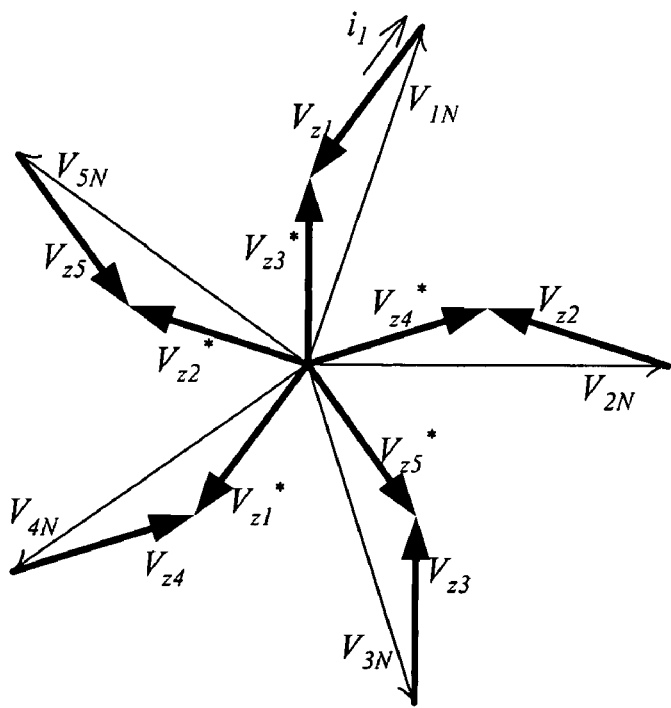

FIGS. 12A and 12B show the voltage vectors for the converters with 4 and 5 phases. From the vector diagrams shown in FIG. 3 and FIG. 12, the winding voltage rating is estimated as, $$V_{zl} = \frac{1}{\sqrt{3}}V_{1N} = 0.577V_{1N}, (n = 3)$$

$$V_{zl} = \frac{1}{\sqrt{2}}V_{1N} = 0.707V_{1N}, (n = 4)$$

$$V_{zl} = \frac{1}{2\cos 18°}V_{1N} = 0.526V_{1N}, (n = 5)$$

Figure 13:
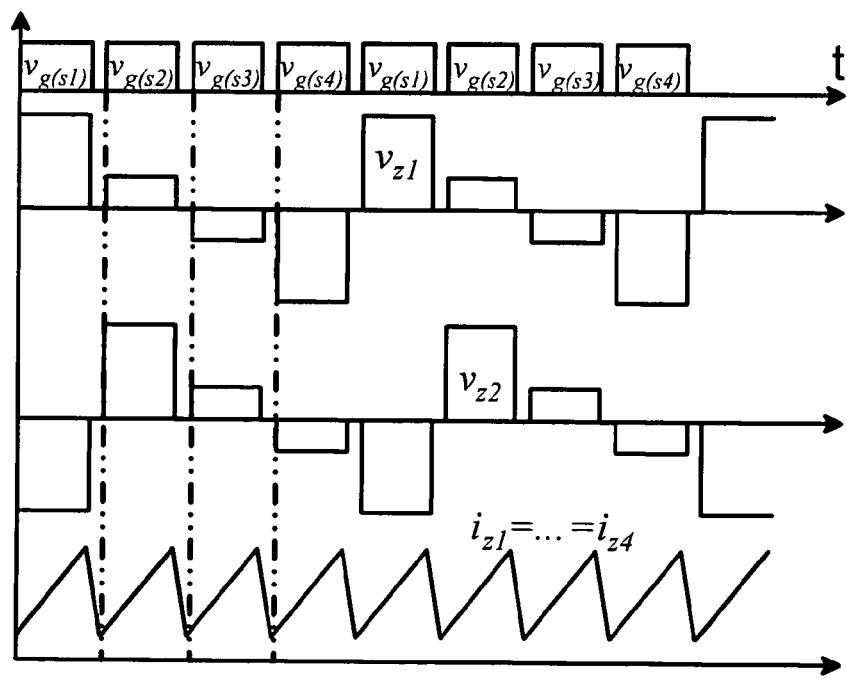
FIG. 13 shows the operational waveforms of the converter with 4 phases in accordance with the invention.

The winding voltages depend on the angle between two windings of the transformer. FIG. 13 shows the operational waveforms for a 4-phase example.

The proposed 3-phase boost converter is implemented with 200 W at 48 V output voltage.

Figure 14A:
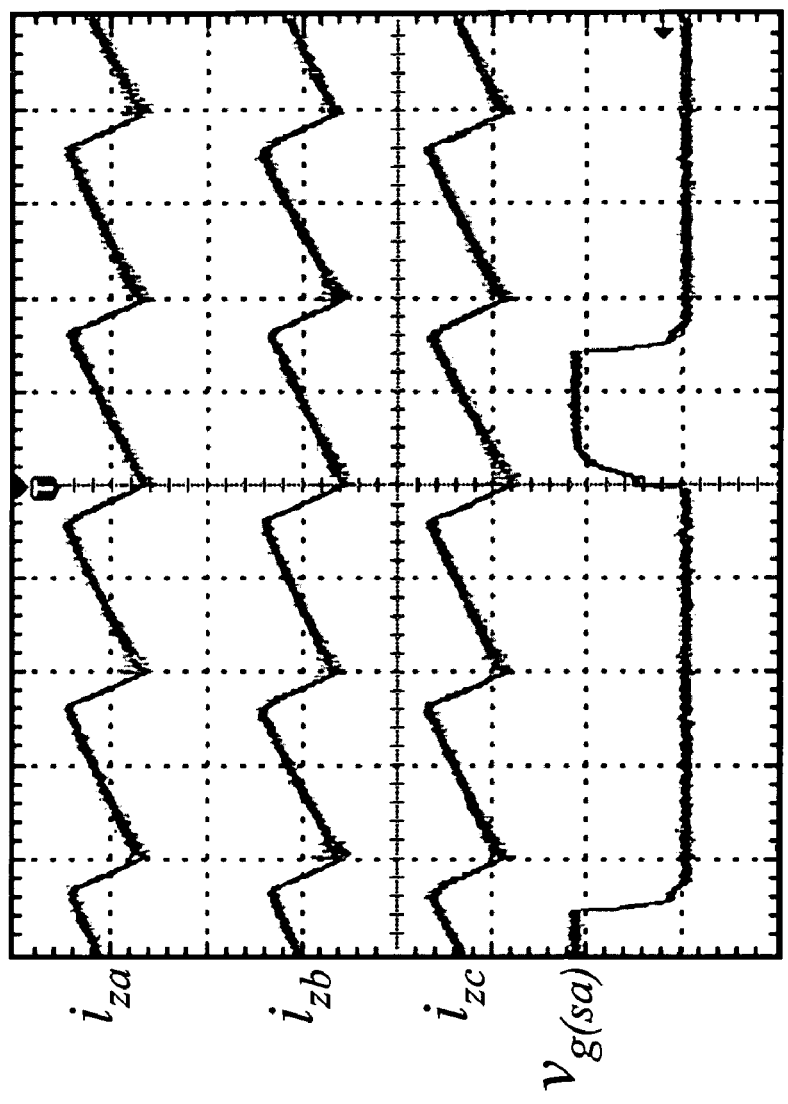
FIG. 14A shows the current waveforms of the experimental results in which $V_s=36V$ and $V_o=48V$.
Figure 14B:
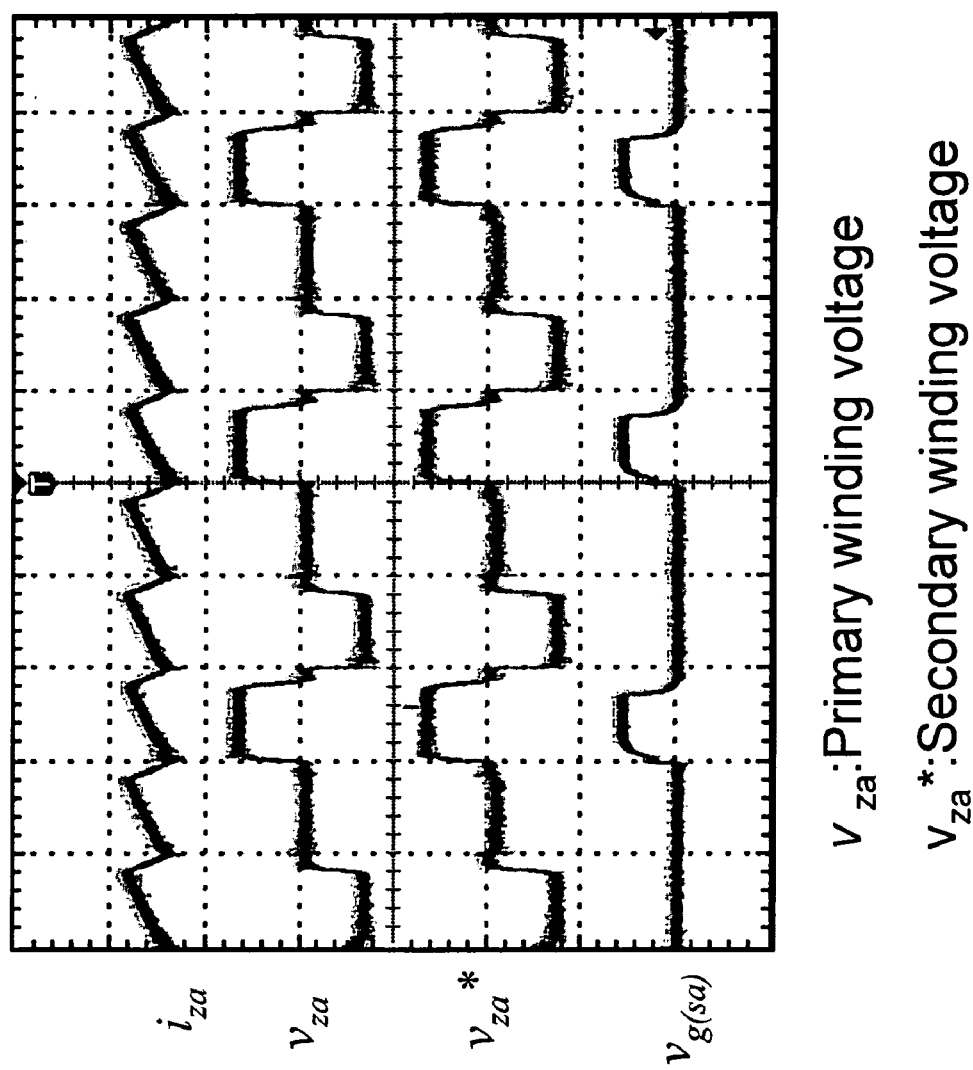
FIG. 14B shows the transformer winding voltages of the experimental results in which $V_s=36V$ and $V_o=48V$.
Figure 15:
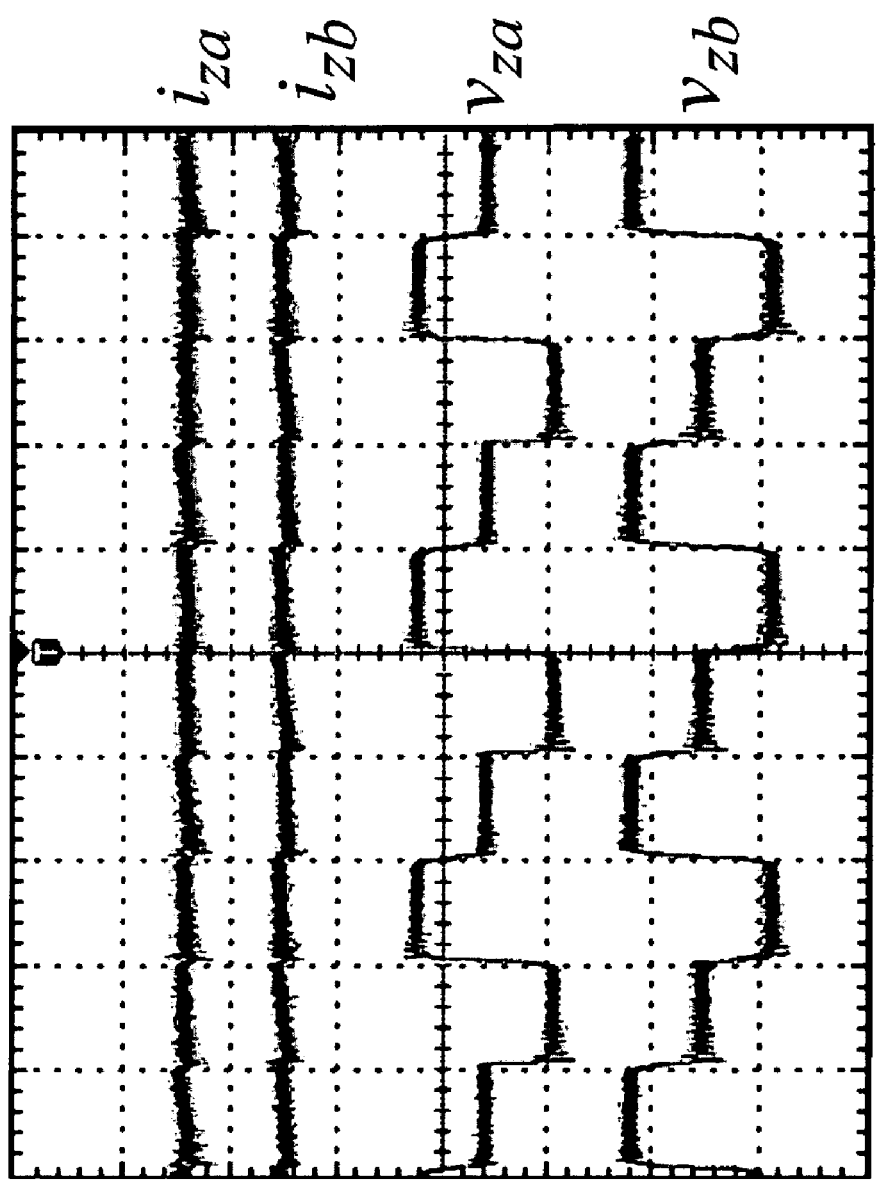
FIG. 15 shows the experimental results at D=33.3% in which $V_s=32V$, $V_o=48V$.

The switching frequency is set to 167 kHz. A very small input inductor compared with the conventional approach is used. Only a single current is sensed instead of 3 different signals. Experimental results are shown in FIGS. 14 and 15. FIG. 14A shows the three identical currents without current sharing. The duty cycle is about 25%. The frequency of the input current and the sum of diode currents is three times the switching frequency (500 kHz). FIG. 14 B shows both primary and secondary winding voltages. FIG. 15 shows the waveforms when the converter operating point is adjusted at boundary condition near D=33.3%. Input voltage 32V is transferred to 48 Vdc. All three input currents are dc constants with no ripples (small). Still all equal currents flow through transformer windings. Also, no ripple currents flow through other switching components.

According to the multiple dc-dc converters with high frequency zigzag transformers in accordance with the invention, the transformer automatically makes all multi-phase currents identical. Therefore, current control can be simplified by sensing a single current for multiple converters without current sharing. Besides, current ripples are eliminated near the boundary conditions where the converter operating point was set. Furthermore, transient response of the converter is improved.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A multiphase DC to DC boost converter comprising:
a zigzag device having at least one N-legged core, wherein N is the number of phases which is greater than or equal to 2, and said at least one N-legged core of the zigzag device has no airgap to form a zigzag transformer;
wherein each phase of the zigzag device comprises a winding having two parts, a first said part wound on a selected leg of said at least one core and a second said part wound on a further leg adjacent said selected leg of said at least one core;
a plurality of diodes, each P side of the diodes connected to each leg of the cores of the device; and
a plurality of transistors, each drain terminal of the transistors connected to each leg of the cores of the device.

2. The converter of claim 1, wherein the zigzag device is an autotransformer which does not provide isolation.

3. A multiphase DC to DC boost converter comprising:
a zigzag device having at least one N-legged core, wherein N is the number of phases which is greater than or equal to 2, wherein said at least one N-legged core of the zigzag device has airgaps to form a zigzag coupled inductors;
wherein each phase of the zigzag device comprises a winding having two parts, a first said part wound on a selected leg of said at least one core and a second said part wound on a further leg adjacent said selected leg of said at least one core.

4. The converter of claim 1, wherein each leg of the core of the zigzag device comprises two windings.

5. The converter of claim 1 further comprises an input inductor connected to a central terminal of the zigzag device for reducing current ripples of the converter.

6. The converter of claim 5, wherein the current ripples are eliminated under boundary conditions.

7. The converter of claim 6, wherein a duty cycle of a boundary condition is h/N, wherein h=1,2,3, . . . , N−1.

8. The converter of claim 1, wherein gate terminals of the transistors receive appropriately phase-shifted signals.

9. A multiphase DC to DC buck converter comprising:
a zigzag device having at least one N-legged core, wherein N is the number of phases which is greater than or equal to 2, and said at least one N-legged core of the zigzag device has no airgaps to form a zigzag transformer;
wherein each phase of the zigzag device comprises a winding having two parts, a first said part wound on a selected leg of said at least one core and a second said part wound on a further leg adjacent said selected leg of said at least one core; and
a plurality pairs of transistors, each of the pair of transistors connected in series, and each leg of the zigzag device connected between the transistors connected in series.

10. The converter of claim 9, wherein the zigzag device is an autotransformer which does not provide isolation.

11. A multiphase DC to DC buck converter comprising:
a zigzag device having at least one N-legged core, wherein N is the number of phases which is greater than or equal to 2, and said at least one N-legged core of the zigzag device comprising airgaps to form a zigzag coupled inductor;
wherein each phase of the zigzag device comprises a winding having two parts, a first said part wound on a selected leg of said at least one core and a second said part wound on a further leg adjacent said selected leg of said at least one core; and
a plurality pairs of transistors, each of the pair of transistors connected in series, and each leg of the zigzag device connected between the transistors connected in series.

12. The converter of claim 9, wherein each leg of the core of the zigzag device comprises two windings.

13. The converter of claim 9 further comprises an output inductor connected to a central terminal of the zigzag device for reducing current ripples of the converter.

14. The converter of claim 13, wherein the current ripples are eliminated under boundary conditions.

15. The converter of claim 14, wherein a duty cycle of a boundary condition is h/N, wherein h=1,2,3, . . . , N−1.

16. The converter of claim 9, wherein gate terminals of the transistors receive appropriately phase-shifted signals.

17. A DC to DC current tripler converter comprising:
an integrated zigzag transformer having at least one 3-legged core;
wherein each phase of the zigzag transformer comprises a winding having two parts, a first said part wound on a selected leg of said at least one core and a second said part wound on a further leg adjacent said selected leg of said at least one core;
a three-phased transformer having a primary winding and a second winding, wherein the second winding is connected to the integrated zigzag transformer;
three pairs of transistors, the two transistors in each pair are connected in series, and each phase of the primary winding is connected between the two transistors in each first pair; and
a first, a second and a third transistor, each drain terminal of the transistors connected to each leg of the cores of the transformer.

18. The converter of claim 17, wherein each leg of the core of the transformer comprises two windings.

19. The converter of claim 17 further comprises an output inductor connected to a central terminal of the transformer for reducing current ripples of the converter.

20. The converter of claim 19, wherein the current ripples are eliminated under boundary conditions.

21. The converter of claim 20, wherein a duty cycle of a boundary condition is ⅓ or ⅔.

22. The converter of claim 17, wherein gate terminals of the first, second and third transistor receive appropriately phase-shifted signals.

23. A current doubler rectifier comprising:
an integrated zigzag transformer with two phases and at least one core;
wherein each phase of the zigzag transformer comprises a winding having two parts, a first said part wound on a selected leg of said at least one core and a second said part wound on a further leg adjacent said selected leg of said at least one core; and
a transformer having a primary winding and a second winding, wherein the second winding is connected to the integrated zigzag transformer.

24. The current doubler rectifier of claim 23 further comprises an output inductor connected to a central terminal of the transformer for reducing current ripples.

25. The current doubler rectifier of claim 23 further comprises two transistors connected to the windings of the two phases of the integrated zigzag transformer.

* * * * *